(12) United States Patent
Beller et al.

(10) Patent No.: US 10,073,833 B1
(45) Date of Patent: *Sep. 11, 2018

(54) DOMAIN-SPECIFIC METHOD FOR DISTINGUISHING TYPE-DENOTING DOMAIN TERMS FROM ENTITY-DENOTING DOMAIN TERMS

(71) Applicant: International Business Machines Corporation, Armonk, NY (US)

(72) Inventors: Charles E. Beller, Baltimore, MD (US); Paul J. Chase, Jr., Fairfax, VA (US); Richard L. Darden, Leesburg, VA (US); Michael Drzewucki, Woodbridge, VA (US); Edward G. Katz, Washington, DC (US); Christopher Phipps, Arlington, VA (US); James E. Ramirez, Stephenson, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,910

(22) Filed: Jun. 9, 2017

Related U.S. Application Data

(63) Continuation of application No. 15/454,778, filed on Mar. 9, 2017.

(51) Int. Cl.
G06F 17/27 (2006.01)
G06F 17/21 (2006.01)
G06F 17/30 (2006.01)

(52) U.S. Cl.
CPC ............ *G06F 17/277* (2013.01); *G06F 17/21* (2013.01); *G06F 17/271* (2013.01);
(Continued)

(58) Field of Classification Search
CPC .... G06F 17/27; G06F 17/2705; G06F 17/271; G06F 17/2735; G06F 17/277; G06F 17/2775; G06F 17/2785
See application file for complete search history.

(56) References Cited

U.S. PATENT DOCUMENTS

| | | | | |
|---|---|---|---|---|
| 5,896,321 A | * | 4/1999 | Miller | G06F 3/023 365/189.15 |
| 6,278,996 B1 | * | 8/2001 | Richardson | G06F 17/273 |

(Continued)

OTHER PUBLICATIONS

Hearst, Marti, "Automatic Acquisition of Hyponyms from Large Text Corpora", Proc. Conf. on Computational Linguistics, v. 2, pp. 539-545 (1992).

(Continued)

*Primary Examiner* — Eric Yen
(74) *Attorney, Agent, or Firm* — Diana Gerhardt; Jack V. Musgrove

(57) ABSTRACT

Large lists of domain-specific terms are classified as a particular kind of linguistic object, e.g., lexical answer type T versus canonical answer E, based on features from a domain-specific corpus which have been found to distinguish between the linguistic objects. The distinguishing features can be identified in the corpus based on sets of the linguistic objects derived from question-and-answer pairs. A classifier can be trained using the distinguishing features, and the classification carried out using that classifier. The distinguishing features can include one or more syntactic features or one or more lexical features. The linguistic objects (the T and E training sets) can be extracted from the question-and-answer pairs automatically via text analysis if manually curated lists are not available. The classified terms can be included in a domain-specific lexicon which facilitates a deep question answering system to yield an answer to a question.

5 Claims, 5 Drawing Sheets

(52) U.S. Cl.
CPC ...... *G06F 17/2715* (2013.01); *G06F 17/2785* (2013.01); *G06F 17/30654* (2013.01); *G06F 17/30684* (2013.01); *G06F 17/30705* (2013.01)

(56) References Cited

U.S. PATENT DOCUMENTS

| | | | | |
|---|---|---|---|---|
| 6,317,707 | B1* | 11/2001 | Bangalore | G06F 17/274 704/255 |
| 8,285,697 | B1* | 10/2012 | Truher | G06F 17/30654 707/706 |
| 8,515,736 | B1* | 8/2013 | Duta | G10L 15/1822 704/9 |
| 2002/0010574 | A1* | 1/2002 | Tsourikov | G06F 17/271 704/9 |
| 2002/0032564 | A1* | 3/2002 | Ehsani | G06F 17/2775 704/235 |
| 2003/0004706 | A1* | 1/2003 | Yale | G06F 17/27 704/9 |
| 2004/0243409 | A1* | 12/2004 | Nakagawa | G06F 17/2755 704/240 |
| 2005/0197992 | A1* | 9/2005 | Kipersztok | G06F 17/2785 706/50 |
| 2008/0097951 | A1* | 4/2008 | Gupta | G06F 17/2785 706/59 |
| 2009/0259613 | A1* | 10/2009 | Liu | G10L 15/22 706/47 |
| 2009/0287678 | A1* | 11/2009 | Brown | G06F 17/30654 |
| 2010/0185943 | A1* | 7/2010 | Wang | G06F 17/2745 715/254 |
| 2011/0040553 | A1* | 2/2011 | Sasivarman | G06F 17/2785 704/9 |
| 2012/0078902 | A1 | 3/2012 | Duboue et al. | |
| 2013/0035931 | A1* | 2/2013 | Ferrucci | G06F 17/2785 704/9 |
| 2013/0091139 | A1* | 4/2013 | Rajpathak | G06F 17/2785 707/740 |
| 2013/0138428 | A1* | 5/2013 | Chandramouli | G06F 17/274 704/9 |
| 2013/0151238 | A1* | 6/2013 | Beaurpere | G06F 17/28 704/9 |
| 2013/0173257 | A1* | 7/2013 | Rose | G06F 17/277 704/9 |
| 2014/0006012 | A1* | 1/2014 | Zhou | G06F 17/30654 704/9 |
| 2014/0019122 | A1* | 1/2014 | New | G06F 17/2765 704/9 |
| 2014/0058723 | A1* | 2/2014 | Shen | G06F 17/2785 704/9 |
| 2014/0222743 | A1* | 8/2014 | Baughman | G06N 5/02 706/46 |
| 2015/0006519 | A1* | 1/2015 | Jain | G06F 11/3636 707/723 |
| 2015/0081275 | A1* | 3/2015 | Ashparie | G06F 17/2818 704/9 |
| 2015/0235132 | A1* | 8/2015 | Allen | G06F 17/30864 706/11 |
| 2015/0254232 | A1* | 9/2015 | Ahmed | G06F 17/2785 704/9 |
| 2015/0286747 | A1 | 10/2015 | Anastasakos et al. | |
| 2015/0339299 | A1 | 11/2015 | Bagchi et al. | |
| 2015/0371137 | A1* | 12/2015 | Giffels | G06N 5/02 706/46 |
| 2016/0005324 | A1 | 1/2016 | Bagchi et al. | |
| 2016/0026634 | A1* | 1/2016 | Allen | G06N 5/02 707/740 |
| 2016/0055155 | A1* | 2/2016 | Allen | G06F 17/3043 707/749 |
| 2016/0283491 | A1* | 9/2016 | Lu | G06F 17/2785 |
| 2016/0357851 | A1* | 12/2016 | Perkins | G06F 17/30613 |
| 2017/0147556 | A1* | 5/2017 | Ajmera | G06F 17/2785 |

OTHER PUBLICATIONS

Lee, Jangho, et al., "Training IBM Watson using Automatically Generated Question-Answer Pairs", Proc. Hawaii Int'l. Conf. on System Sciences, pp. 1683-1691 (2017).

Nickel, Maximilian, et al., "A Review of Relational Machine Learning for Knowledge Graphs", Proc. of the IEEE, v. 104, n. 1 (2016).

Snow, Rion, et al., "Learning syntactic patterns for automatic hypernym discovery", Proc. Int'l. Conf. on Neural Information Processing Systems, pp. 1297-1304 (2004).

Xu, Jinxi, et al. "Query Expansion Using Local and Global Document Analysis", Proc. Int'l. ACM SIGIR Conf. on Research and Development in Information Retrieval, pp. 4-11 (1996).

* cited by examiner

| Question | Answer |
|---|---|
| What country has the most people? | China has the world's largest population. |
| What is the tallest mountain in the world? | Mount Everest is called the world's highest mountain because it has the highest elevation above sea level. |
| Where is a rainforest? | The largest rainforests are in the Amazon River Basin (South America), and the Congo River Basin (western Africa). |
| Where is the ocean deepest? | Marianas Trench is the deepest known part of the world's oceans |
| Are there lakes in mountains? | Many lakes have been formed in the calderas of extinct volcanos. |
| What is the world's longest river? | The longest river in the world, measured from its mouth to its most distant, year-round source, is likely the Amazon. |
| ... | ... |

DOMAIN-SPECIFIC METHOD FOR DISTINGUISHING TYPE-DENOTING DOMAIN TERMS FROM ENTITY-DENOTING DOMAIN TERMS

STATEMENT REGARDING FEDERALLY SPONSORED RESEARCH OR DEVELOPMENT

This invention was made with United States Government support under agreement no. 2013-12101100008. THE GOVERNMENT HAS CERTAIN RIGHTS IN THIS INVENTION.

BACKGROUND OF THE INVENTION

Field of the Invention

The present invention generally relates to natural language processing, and more particularly to a method of analyzing text to categorize large sets of domain-specific terms.

Description of the Related Art

As interactions between humans and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

Text analysis is known in the art pertaining to NLP and typically uses a text annotator program to search text documents (corpora) and analyze them relative to a defined set of tags. Text annotators and corpora can be domain-specific, that is, intended for use in a particular context of interest such as medicine, business processes, sports, etc. The text annotator can generate linguistic annotations within the document to tag concepts and entities that might be buried in the text. A cognitive system can then use a set of linguistic, statistical and machine-learning techniques to analyze the annotated text, and extract key information such as person, location, organization, and particular objects (e.g., vehicles), or identify positive and negative sentiment. Front-end NLP can include identification of a lexical answer type and a focus among others. A lexical answer type (LAT) is a term in a question that indicates what type of entity is being asked for, i.e., the primary concept that is being discussed. Focus is essentially the subject of the text or, in the case of a question, the answer to the question or a reference to the answer (an entity). For example, a LAT in a question might be a person type, with the answer being a specific person.

SUMMARY OF THE INVENTION

The present invention in at least one embodiment is generally directed to a method of distinguishing at least two classes of domain-specific terms that are crucial to the domain-specific natural language processing involved in deep question answering—a set T of domain-specific terms that refer to domain entity types and a set E of domain-specific terms that refer to domain entities. This is accomplished by making use of a training set T' of domain terms known to refer to domain entity types and a set E' of domain terms known to refer to domain entities to identify distinguishing features from one or more corpora specific to a particular domain wherein the distinguishing features distinguish the linguistic objects in T' from the linguistic objects in E', and using these features to classify the terms from a list specific to the particular domain. In the illustrative implementations an automatic machine-learning classifier can be trained using the distinguishing features, and the classifier can then be used to classify the terms from the domain specific terminology list. The distinguishing features can include one or more syntactic features or one or more lexical features. The training sets (the T' and E' sets) can be extracted from the question-and-answer pairs automatically via text analysis if manually curated lists are not available. The classified terms can be included in a domain-specific lexicon which facilitates a deep question answering system to yield an answer to a question.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 2 is a table of domain-specific question-and-answer pairs from which linguistic objects are extracted in accordance with one implementation of the present invention;

The use of the same reference symbols in different drawings indicates similar or identical items.

DESCRIPTION OF THE PREFERRED EMBODIMENT(S)

Figure 1:
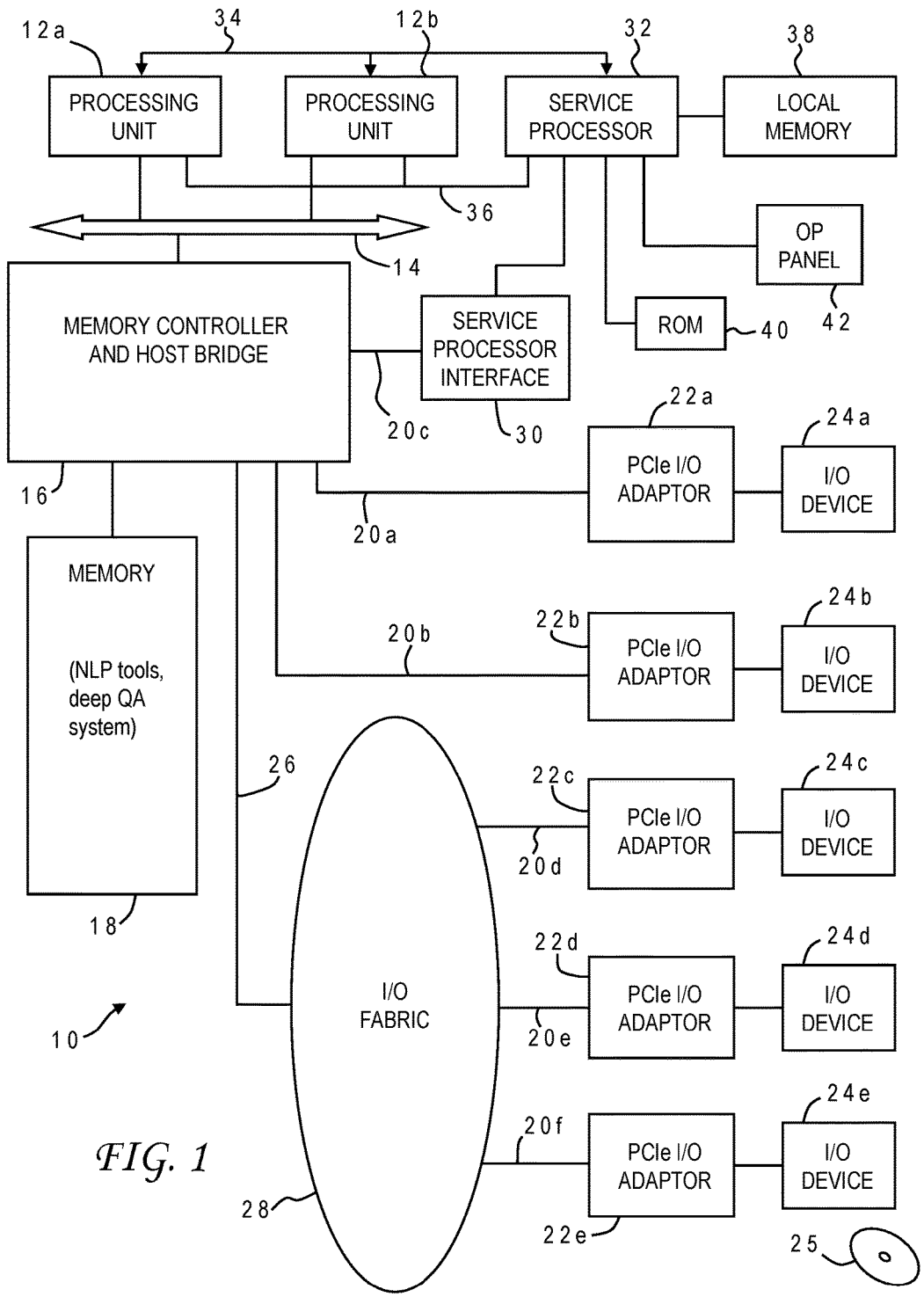
FIG. 1 is a block diagram of a computer system programmed to carry out natural language processing, including domain-specific term classification, in accordance with one implementation of the present invention.

Deep question answering systems make a distinction between terms that refer to types of entities and terms that refer to entities. These two classes of terms play important roles in the processing mechanisms built into deep question answering systems, and provisioning a deep question understanding system with adequate domain-specific lexical resources that articulate this distinction for a specific domain is one of the crucial ways in which domain adaption of such systems proceeds. Terms that refer to types are often good candidates for the lexical answer type (LAT) of a question, while terms that refer to entities are often good candidates for the answer itself. This distinction can be crucial to answer generation, answer scoring, answer filtering and other components of deep question answering. While a given term might refer both to a type of entity and refer to an entity, for a particular domain, terms that make good answer types tend to make bad answers and terms that make good answers are generally bad types.

In adapting a deep question answering system to a given domain, subject matter experts often provide lists of words and multi-word terms that are relevant to their domain, and these terms must be sorted into terms referring to types and terms referring to entities for them to be used appropriately in the deep question answering lexicon. Experience has shown that subject matter experts have difficulty making this distinction, and that it is a time consuming task for domain adaptation language technology experts. This distinction is often highly domain-specific. For example, the word "protein" may have a different role to play for question answering in the cancer research domain than in the body building domain. These different roles can be seen by comparing some question-and-answer (QA) sets for such domains. Here are two sample body building domain QAs where "protein" is an answer.

Question: What can I add to my diet to build muscle?
Answer: Protein is the cornerstone of my bodybuilding nutrition plan in that it determines how many meals I eat each day.
Question: What is seafood is an excellent source of?
Answer: Seafood is an excellent source of protein and it's usually low in fat.

Here are two sample cancer research domain QAs where "protein" is a LAT.

Question: What kinds of proteins act as immune system targets?
Answer: Researchers have spotted rare 'flag' proteins that act as immune system targets and are displayed on the surface of all of a patient's tumor cells, wherever they might be in the body.
Question: What two proteins did a Stanford team use to stop metastasis, without side effects?
Answer: The Stanford team seeks to stop metastasis, without side effects, by preventing two proteins—Axl and Gas6—from interacting to initiate the spread of cancer.

In customizing a deep question answering system with thousands of terms to be added, determining what role a term will play is thus a critical task, which feeds not only the deep question answering system itself, but also provides useful feedback to the domain adaptation team as to potential gaps in the taxonomy that should be filled, for example, type names that have only a few answer-level (entity) names associated with them. However, customer-provided lists of domain-specific terms are very time-consuming to sort into categories that are required for NLP systems. It would, therefore, be desirable to devise a method of automatically categorizing large sets of domain-specific terms. It would be further advantageous if the method could leverage other resources already available as part of front-end NLP.

The present invention achieves these objectives by leveraging existing artifacts involved in the domain adaptation task to automatically classify domain terms into those that refer to entities and those that refer to entity types. In exemplary implementations, this would involve extracting training sets of linguistic objects from domain-specific question-and-answer pairs, identifying features from a domain-specific corpus which can be used to distinguish these sets of linguistic objects, and using these features to classify domain terms in a large list of terms as being one of the particular linguistic objects, e.g., either a "likely LAT" or a "likely entity".

With reference now to the figures, and in particular with reference to FIG. 1, there is depicted one embodiment 10 of a computer system in which the present invention may be implemented to carry out natural language processing including domain-specific term classification. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein various NLP tools, including term classifier tools as taught herein.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the NLP application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for natural language processing that uses novel analysis techniques to manage the classification of large lists of domain-specific terms. Accordingly, a program embodying the invention may include conventional aspects of various NLP tools, and these details will become apparent to those skilled in the art upon reference to this disclosure.

In many deep question answering systems, the system is tuned to specific application domains by engaging in a process known as domain adaptation. This task is usually performed by an experienced NLP analyst working in concert with an expert in the particular domain of interest. In a typical domain adaptation exercise, domain experts are called upon to submit long lists of domain terms for ingestion into the system. The NLP analyst then assesses the list to create domain-specific dictionaries, on the basis of general knowledge about the role of domain dictionaries in the system and additional knowledge of the domain, distinguishing terms that may be answers from terms that refer to types of answers. This task is difficult and time consuming, and adequately tuning the domain dictionaries is a significant problem that calls out for an systematic solution. The present invention addresses this problem.

In addition to generating terminology lists, domain experts often create reasonably large sets of question-and-answer pairs that reflect the kinds of domain-specific questions that users of the deep question answering system might be expected to put to their system as well as identifying domain-specific document sets (corpora) that will contain answers to these questions. The current invention can leverage these QA pairs and these corpora to classify the domain terms as summarized above. This classification method is specific to a given domain and corpus. The general idea is to develop a text classifier to distinguish elements in the domain terms list into at least two linguistic classes, particularly a type (T) class and an entity (E) class. Training data for this classifier is derived from the QA pairs, with the identified lexical answer types from the questions serving as T-class ground truth and the identified answer entities to the questions serving as E-class ground truth. In this manner, domain-specific training data can be applied to domain-specific corpora to derive a domain-specific classifier that can distinguish domain terms into domain T terms (those terms that are used in that domain typically as types of answers) and domain E terms (those terms that are used in that domain typically as answers to questions).

Referring now to FIG. 2, there is depicted an exemplary set 50 of domain-specific question-and-answer pairs. For this example, the domain is world geography. The QA pairs can be curated by any means, including manual, or using collections of previously derived QA pairs. There are preferably hundreds of QA pairs in set 50. The QA pairs may include a previous identification of LAT terms and answer entities, or they can be examined by computer system 10 using conventional text analysis to automatically identify these and other types of linguistic objects. For example, named entity recognition is known in the art and uses linguistic grammar-based techniques as well as statistical models, i.e. machine learning, to annotate sentences (including questions). The QA pairs can be stored on computer system 10 or remotely.

Figure 3A:
FIGS. 3A and 3B are tables of lexical answer types (T) and answer entities (E) extracted from the question-and-answer pairs of FIG. 2 in accordance with one implementation of the present invention.
Figure 3B:

Terms can be extracted from the multiple QA pairs by computer system 10 and assigned into one of at least two sets (T and E) as further seen in the tables 60, 62 of FIGS. 3A and 3B. FIG. 3A shows the set T of LATs extracted from the QA pairs, and FIG. 3B shows the set E of entities extracted from the QA pairs. For example, the first QA pair in table 50 are "What country has the most people?" and "China has the world's largest population." From these sentences, the term "country" has been identified as a LAT and added to table 60, while the word "China" has been identified as an entity and added to table 62. Other extracted LATs include "mountain", "rainforest", "ocean", "lake", and "river", and other extracted entities include "Mount Everest", "Amazon River Basin", "Marianas Trench", "caldera", and "Amazon". As with table 50, there can be hundreds or even thousands of entries in tables 60, 62. The T and E sets can also be stored on computer system 10 or remotely.

Figure 4:
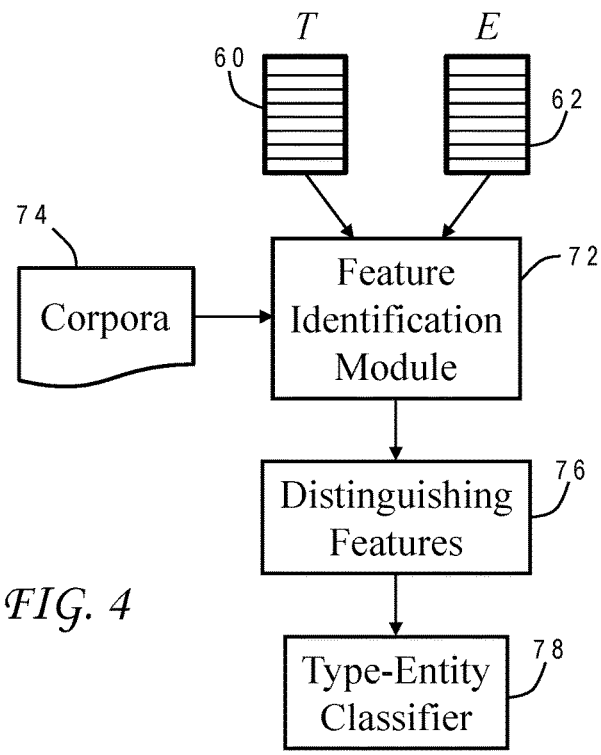
FIG. 4 is a block diagram of a classifying system constructed in accordance with one implementation of the present invention wherein linguistic objects extracted from the question-and-answer pairs are used to identify distinguishing features from a domain-specific corpus, and those distinguishing features are then used to train a natural language classifier.

FIG. 4 shows how the T and E tables 60, 62 can be used in one implementation of the present invention to identify features of the domain of interest which can in turn be used to distinguish terms as different linguistic objects. A feature identification module 72 running on computer system 10 takes the terms from the T and E tables 60, 62 and searches for those terms with a domain-specific corpus or corpora 74. Computer system 10 can then examine the usage of the particular terms as found within corpora 74 to identify features 76 which appear to be common to one class or another (LAT or entity). Any feature having statistical significance can be used, particularly syntactic features and lexical features. For example, a syntactic feature might be 'appears as the subject of a sentence' (e.g., "Protein is good for you') or 'appears as the possessor phrase' (e.g., "Lincoln's wife was strange."). Syntactic-lexical binary features can also be used, e.g., the term occurring before the phrase "such as" or occurring after the phrase "kinds of", ngrams (a contiguous sequence of items from a given snippet of text), or combinations of any of the foregoing. These distinguishing features can be used to build a type-entity classifier 78 which is trained on the two sets T and E. Classifier 78 can also be stored on computer system 10 or remotely.

Figure 5:
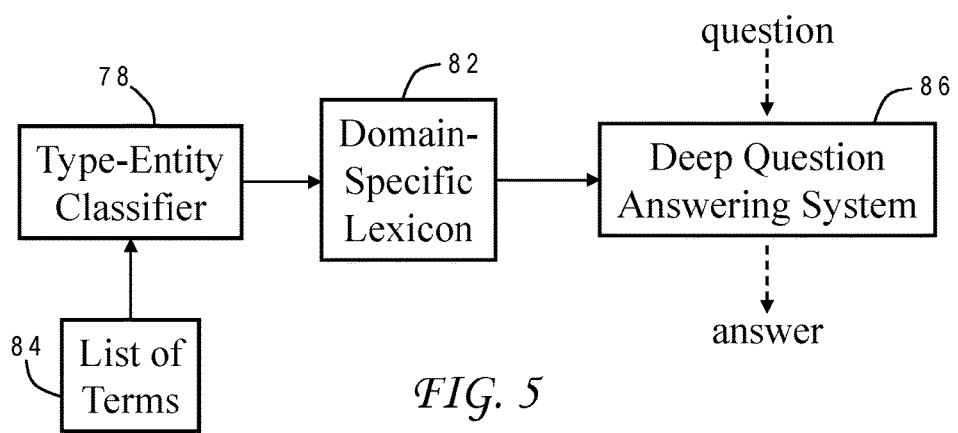
FIG. 5 is a block diagram showing the use of the natural language classifier to categorize large sets of terms which can then be used to support a deep question answering system in accordance with one implementation of the present invention.

FIG. 5 illustrates how the type-entity classifier 78 thus constructed can be further used to generate a domain-specific lexicon or dictionary 82 in accordance with one embodiment of the present invention. Classifier 78, running on computer system 10, receives a list of terms 84 pertaining to the domain of interest, and uses the distinguishing features (also domain-specific) to classify each term in list 84 as either a "likely LAT" or a "likely entity". In one embodiment, for example, the classifier can be based on features reflecting common syntactic contexts of a term as it appears in the corpus (where syntactic context might be distinguished by the sequence of words before and after the term, and the frequency of the context might be a count of the number of times the same words appear before and after words in a designated class). Using these kind of features, the N most frequent contexts in which terms on the T-class ground truth list appear would be extracted from the corpus along with the N most frequent contexts in which terms in E-class ground truth list appear. A target term from the domain terms list might be classified by determining if its distribution within a domain-specific corpus (such as in corpora 74) is more like the T-class terms or the E-class terms (in the simplest case by counting how many of the T-class frequent contexts it appears in and how many of the E-class frequent contexts it appears in). Other potential corpus-specific classification methods could be used. The resulting lexicon 82 includes an appropriate tag for each term indicating its determined class, and can then be used by a deep question answering system 86 to facilitate the provision of a natural language answer to a natural language question. Deep question answering system 86 can also be running on computer system 10.

One example of a way in which these tags can facilitate the deep question answering system is in answer scoring. In many deep question-answering systems—such as Watson™ systems—one component of the process involves determining whether a term identified as a possible answer to the question is of the right type. So in the case of "Which substance was used by Stanford to . . . ?", much of the processing involves identifying candidate answers (such as "Gas6"); if we know that in the given domain there is a type "protein"—which is a substance—and that "Gas6" is an entity of this type, then that answer would be highly scored and returned as a good result.

Figure 6:
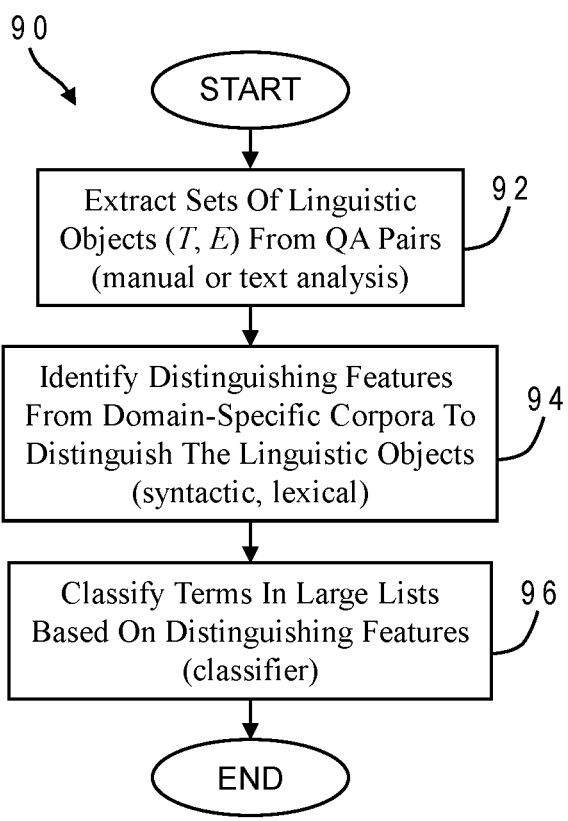
FIG. 6 is a chart illustrating the logical flow of a classification procedure in accordance with one implementation of the present invention.

The present invention may be further understood with reference to the chart of FIG. 6 which illustrates the logical flow for a classification process 90 in accordance with one implementation of the present invention, which may be carried out on computer system 10. Process 90 begins by extracting sets of linguistic objects from question-and-answer pairs (92). There must be at least two kinds of linguistic objects extracted, such as lexical answer type and answer entity. Features from a domain-specific corpus are identified which distinguish the kinds of linguistic objects so extracted (94). These distinguishing features can be based on various statistical measures of different usages of the objects, particularly syntactic or lexical contexts. Terms in large lists can then be automatically classified, e.g., as either LAT or answer based on the distinguishing features (96). In the illustrative embodiment, this step is carried out with a classifier trained with the distinguishing features.

The present invention thereby provides an efficient and effective method of categorizing very large sets of terms associated with a particular domain. This approach not only saves countless hours of manual classification, but further provides a more robust lexicon which can help a deep question answering system provide superior results.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of distinguishing domain-specific terms from a list specific to a particular domain comprising:
   extracting linguistic objects from a set of question-and-answer pairs wherein the linguistic objects include lexical answer types and answer entities, by executing first instructions in a computer system;
   grouping the lexical answer types into a first set and grouping the answer entities into a second set, by executing second instructions in a computer system;
   identifying distinguishing features of one or more corpora specific to the particular domain wherein the distinguishing features distinguish the lexical answer types in the first set from the answer entities in the second set, by executing third instructions in the computer system;
   training a natural language classifier using the distinguishing features; and
   classifying the domain-specific terms as either lexical answer type or answer entity based on the distinguishing features, by executing fourth instructions in the computer system, wherein said classifying uses the natural language classifier.

2. The method of claim 1 wherein the distinguishing features include one or more syntactic features.

3. The method of claim 1 wherein the distinguishing features include one or more lexical features.

4. The method of claim 1 wherein said extracting uses text analysis to automatically extract the linguistic objects.

5. The method of claim 1 further comprising applying a lexicon of classified terms to a deep question answering system to yield an answer to a question.

* * * * *